United States Patent [19]
Cook et al.

[11] Patent Number: 5,931,181
[45] Date of Patent: Aug. 3, 1999

[54] ANTI-SCALD FAUCET SYSTEM

[75] Inventors: William David Cook, Sherman Oaks; Yuhung Edward Yeh, Tarzana, both of Calif.

[73] Assignee: Emhart Inc., Newark, Del.

[21] Appl. No.: 08/879,094

[22] Filed: Jun. 19, 1997

[51] Int. Cl.⁶ .................................................. G05D 11/00
[52] U.S. Cl. ................... 137/100; 137/599; 137/625.41; 137/613; 137/606
[58] Field of Search ..................... 137/607, 606, 137/100, 98, 625.41, 613, 599; 236/12.13

[56] References Cited

U.S. PATENT DOCUMENTS

| | | | |
|---|---|---|---|
| 2,009,102 | 7/1935 | Bern | 137/100 |
| 2,264,876 | 12/1941 | Hackley | 137/606 |
| 2,296,266 | 9/1942 | Breckenridge | 137/607 |
| 2,808,848 | 10/1957 | Cooper | 137/100 |
| 3,536,097 | 10/1970 | Caparone | 137/606 |
| 4,324,267 | 4/1982 | Bach | 137/100 |
| 4,669,653 | 6/1987 | Avelov | 137/625.41 |
| 4,834,130 | 5/1989 | North | 137/100 |
| 5,431,187 | 7/1995 | Nee | 137/599 |
| 5,462,224 | 10/1995 | Enoki | 137/606 |
| 5,501,244 | 3/1996 | Shahriar | 137/625.41 |

*Primary Examiner*—Denise L. Ferensic
*Assistant Examiner*—Ramyar Farid
*Attorney, Agent, or Firm*—Harold Weinstein

[57] ABSTRACT

A faucet system includes a cold water control valve and a hot water control valve. These control valves are in communication with each other through a cold water supply conduit and a mixed water conduit. The hot water control valve includes a needle valve and a valve seat. The needle valve is adjustable with respect to the valve seat to adjust the maximum temperature of hot water being supplied by the hot water control valve to the mixed water conduit. In one embodiment, the hot water control valve of the faucet system further includes a pressure balancer disposed between the hot and cold water supply and the hot and cold control valves.

5 Claims, 6 Drawing Sheets

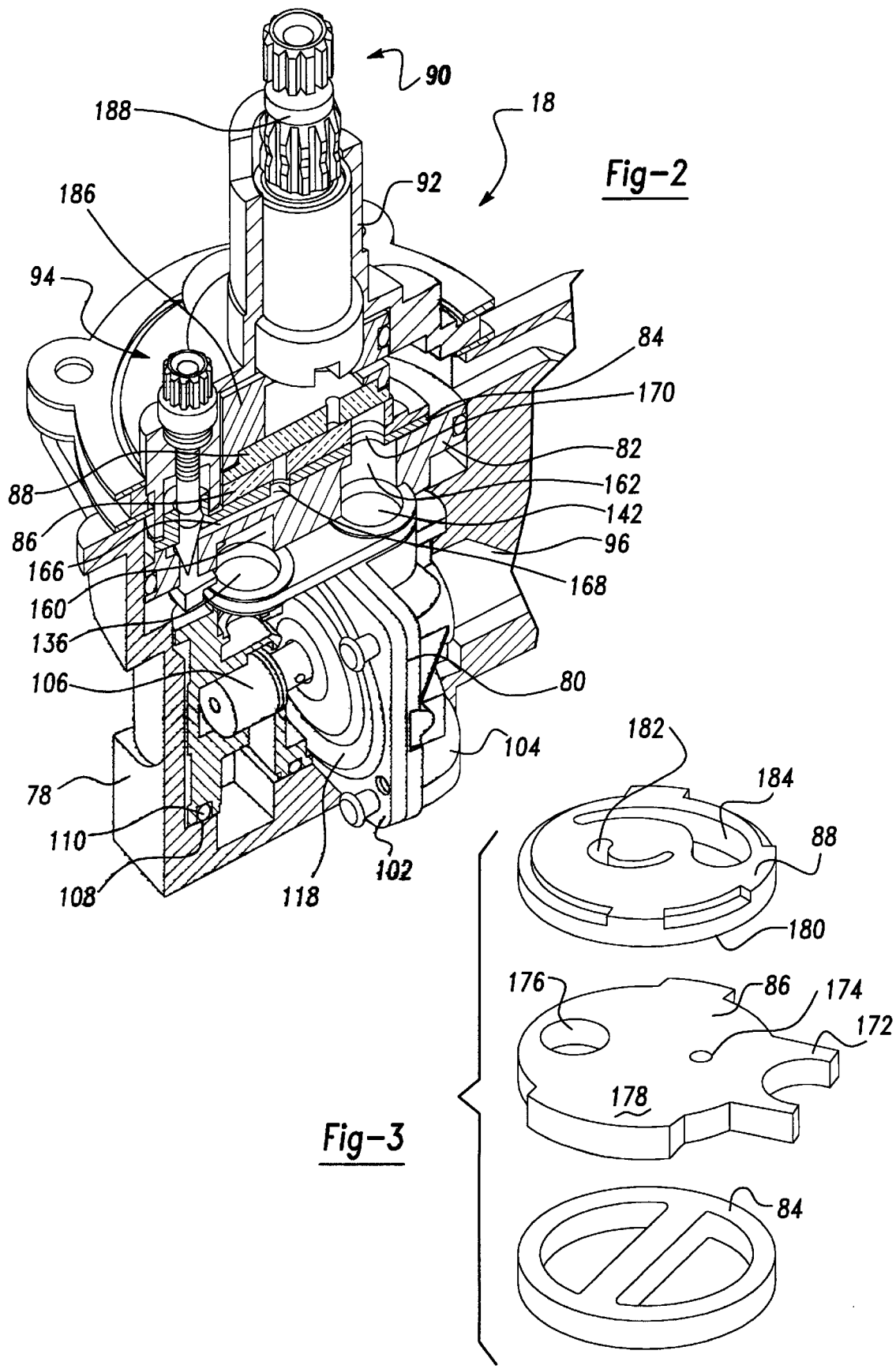

ANTI-SCALD FAUCET SYSTEM

FIELD OF THE INVENTION

The present invention relates to a two and/or three handle faucet system. More particularly, the present invention relates to a faucet system which includes an anti-scald pressure balancer and a high temperature limit control.

BACKGROUND OF THE INVENTION

Performance standards for plumbing products in general and faucet systems in particular are being required by more and more communities for both residential and commercial construction. The standards which are being adopted include standards relating to maintaining mixed water temperature as well as standards relating to high temperature limits for the mixed water supply for the faucet systems.

A pressure balancer is used in a hot/cold water supply system to meet the first standard noted above and maintain mixed water temperature in response to pressure fluctuations in the hot or cold water supply lines. The pressure balancer is designed to operate in a commercial system where the hot water pressurization system is separate from the cold water pressurization system and in a residential system where the pressurization of the hot and cold water systems is common. When water is demanded by a user for showering, the user adjusts the mixing valve to attain a desired temperature of the mixed hot and cold water. If, during the course of showering, the cold water pressure fails or drops significantly, the user is then subjected instantaneously and unexpectedly to an increase in the temperature of the mixed hot and cold water. This could result in serious scalding of the user. Similarly, if the hot water pressure fails or drops significantly, the user is subjected instantaneously and unexpectedly to a decrease in the temperature of the mixed hot and cold water. While this situation is not as potentially harmful to the user's well being as a reduction in the cold water pressure, the reduction of the hot water pressure can still be startling and extremely unpleasant.

The pressure balancer is incorporated into the hot and cold water supply systems to eliminate the unexpected reaction to the reduction of either the hot or cold water supply pressure. The pressure balancer operates to shut off the supply of hot or cold water upon a failure of the pressurized supply of the other. The pressure balancer also responds to changes in the pressure of the hot and cold water supplies where the changes in pressure are sufficient to alter the mix ratio of the hot and cold water and thus the temperature of the mixed water. The pressure balancer responds to the pressure fluctuations by balancing or equalizing the water flow on the hot water side and the cold water side of the pressure balancer to maintain the mix ratio of the hot and cold water and thus maintain the temperature of the mixed water.

The second standard which is being adopted is a high temperature limit control for faucet systems. The high temperature limit control is designed to limit the hot water temperature which is available from the hot water supply system to a level which will prevent scalding of an individual. The high temperature limit control can be accomplished by placing a stop on a single handle faucet which prohibits the movement of the handle to a position which provides full hot water flow with no cold water flow. Thus, a combination of hot and cold water will always be supplied to the mixing valve thereby limiting the temperature of the mixed water. The stop for the single handle faucet is preferably designed with adjustability in order to compensate for varying supply temperatures of the hot and cold water systems.

Another method for accomplishing the high temperature limit control is to mechanically link the hot and cold water control valves with a lost motion device in an two/three handle faucet in order to provide the mixing of cold water with the hot water to limit the temperature of the supplied water. While this approach is feasible, the intricacies of the mechanism, the potential high cost of the mechanism and the durability of the mechanism prohibit the development of faucet systems using this concept.

Thus, there is a need for a two/three faucet system which incorporates a pressure balancer and a high temperature limit control in a simplified and cost effective manner. The faucet system should incorporate both of these controls while still maintaining convenience to the user for adjustability as well as accessibility to the inner working of the faucet system for maintenance purposes.

SUMMARY OF THE INVENTION

The present invention provides the art with a two or three handle faucet system which incorporates both the pressure balancing control and the high temperature limit control while providing convenience and accessibility to the user. In one embodiment, both control systems are incorporated into the hot water control valve. In another embodiment, the pressure balancing system is remote from both the hot and cold water control valve. Both the embodiments provide an adjustment device for convenient adjustment of the high temperature limit and accessibility to the inner workings of the control valves and the control systems. The high temperature control system is independent from the cold water control valve enabling the control system to function when only the hot water control valve is opened.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 2 is a perspective view, partially in cross section, of the faucet system shown in FIG. 1;

FIG. 3 is an exploded perspective view of the valve throttling elements and inlet seal in the faucet system shown in FIG. 1;

DETAILED DESCRIPTION OF THE PREFERRED EMBODIMENT

Figure 1:
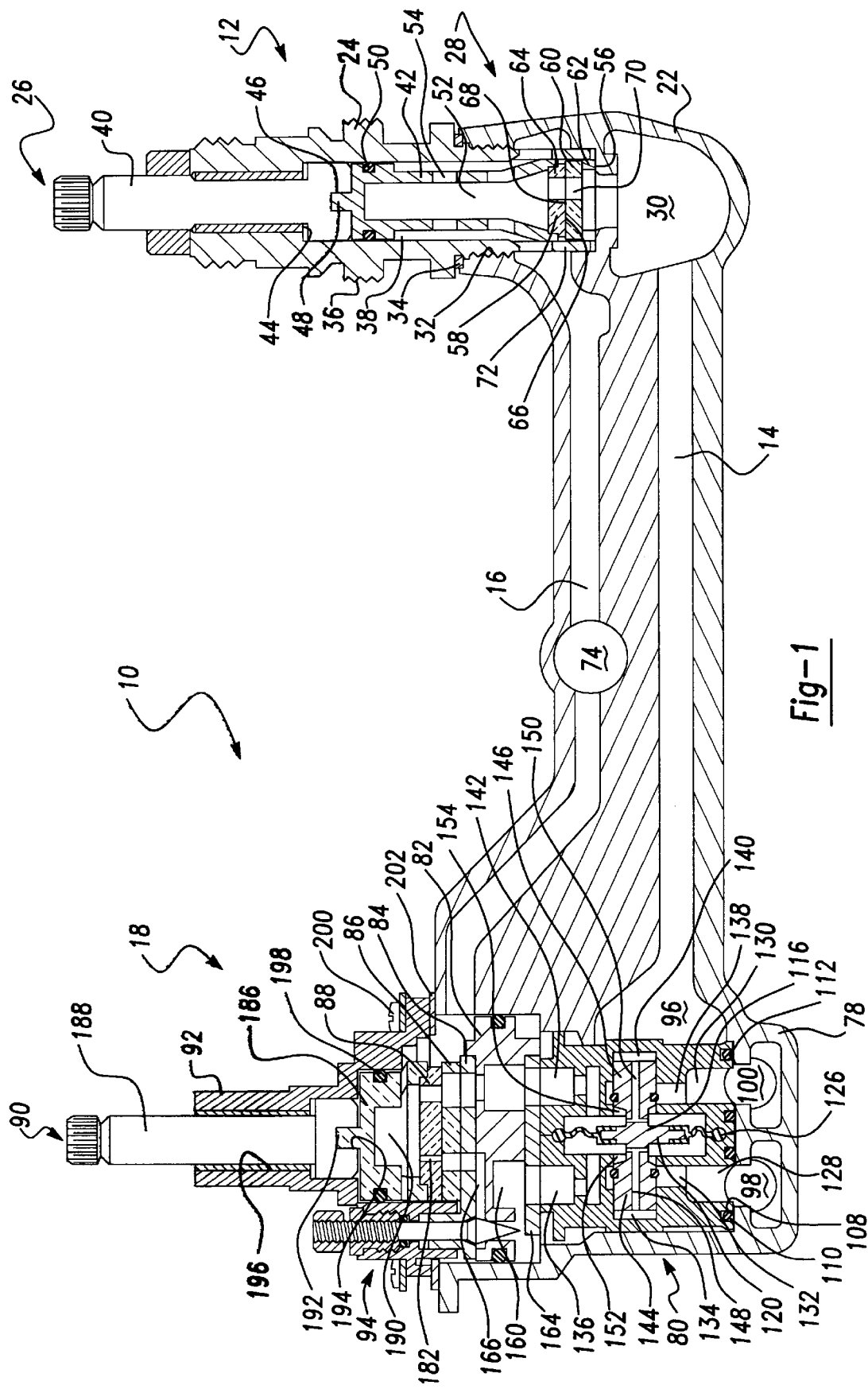
FIG. 1 is a cross sectional view of a two handle anti-scald faucet system in accordance with the present invention.

Referring now to the drawings in which like reference numerals designate like or corresponding parts throughout the several views, there is shown in FIG. 1 an anti-scald faucet system in accordance with the present invention which is designated generally by reference numeral 10. Faucet system 10 comprises a cold water control valve 12, a cold water supply conduit 14, a mixed water supply conduit 16 and a hot water control valve 18. Cold water control valve 12 is a conventional control valve having a housing 22, a bonnet 24, a stem assembly 26 and a valve assembly 28. Housing 22 is integrally formed with conduits 14 and 16 and it defines a chamber 30 which receives cold water from supply conduit 14 and supplies cold water to mixed water supply conduit 16. Housing 22 defines a threaded bore 32 which is open to chamber 30.

Bonnet 24 is threadingly received within bore 32 to retain stem assembly 26 and valve assembly 28 within chamber 30. A seal 34 seals the interface between bonnet 24 and housing 22. Bonnet 24 includes an exterior configuration 36 which is adapted to receive various components which locate and secure faucet system 10 to the building structure of the tub and/or shower with which faucet system 10 is being used as well as decorative trim components. Bonnet 24 defines an internal chamber 38 having a bushing within which stem assembly 26 is located.

Stem assembly 26 comprises an outer stem 40 and an inner stem 42. Outer stem 40 is located within chamber 38 and is retained within chamber 38 by interfacing with a shoulder 44 formed by chamber 38. One end of outer stem 40 extends outwardly of bonnet 24 and is adapted to receive a control knob (not shown). The interface between outer stem 40 and shoulder 44 also operates to retain inner stem 42 and valve assembly 28 within chambers 38 and 30 as described below. The opposite end of outer stem 40 or the end disposed within chamber 38 provides the connection between outer stem 40 and inner stem 42. Outer stem 40 defines a slot 46 which accepts a tab 48 on inner stem 42 to rotationally couple outer stem 40 with inner stem 42. Inner stem 42 is a cup shaped component which is located within chamber 38 between outer stem 40 and valve assembly 28. An O-ring 50 seals the interface between inner stem 42 and bonnet 24 to retain water within chamber 38. Inner stem 42 defines a chamber 52 which is in communication with chamber 38 through a plurality of holes 54. The end of inner stem 42 opposite to tab 48 is rotationally coupled to valve assembly 28.

Valve assembly 28 is disposed within chamber 30 between stem assembly 26 and a shoulder 56 defined in chamber 30 by housing 22. Valve assembly 28 comprises a rotating ceramic disk 58, a stationary ceramic disk 60 and a rubber seal 62. Rotating ceramic disk 58 is rotatably secured to inner stem 42 and it defines a tear shaped aperture 64 which regulates the amount of cold water that is allowed to pass through valve assembly 28. Rotating ceramic disk 58 includes a highly polished surface 66 for mating with stationary disk 60.

Stationary disk 60 is disposed adjacent to surface 66 of disk 58 and it includes a highly polished surface 68 which mates with surface 66 to form a fluid tight connection between the two surfaces. Stationary disk 60 defines a generally circular aperture 70 which is positioned to align with tear drop shaped aperture 64 of rotating ceramic disk 58. Stationary disk 60 is prohibited from rotating with in chamber 30. Rubber seal 62 is disposed between stationary disk 60 and shoulder 56 to prohibit fluid flow between stationary disk 60 and shoulder 56. Thus, all fluid flow through valve assembly 28 occurs through apertures 70 and 64. Retainer 72, integral with bonnet 24, surrounds disk 58, disk 60 and rubber seal 62 to maintain the concentric alignment of these components during the rotation of rotating ceramic disk 58.

The assembly of cold water control valve 12 is accomplished by inserting valve assembly 28 within chamber 30 of housing 22, positioning stem assembly 26 within chamber 30 and rotationally coupling it with valve assembly 28 and then threading bonnet 24 into bore 32 to secure the components of the valve. In the alternative, stem assembly 26 can be positioned within chamber 38 of bonnet 24, mating valve assembly 28 with inner stem 42 and inserting this assembly into bore 32 of housing 22 and threadingly engaging bonnet 24 with bore 32 of housing 22. The threading engagement between bonnet 24 and housing 22 permits the compression of seal 34 and rubber seal 62. Once assembled, valve assembly 28 operates to meter the cold water flow through valve assembly 28 from a blocked flow position to a full open position based on the rotational position of rotating ceramic disk 58 with respect to stationary ceramic disk 60. When rotating disk 58 is positioned such that aperture 70 of disk 60 is aligned with a solid portion of disk 58 and not a portion of aperture 64, fluid flow will be blocked due to the fluid tight engagement of surface 66 with surface 68. Rotation of outer stem 40 causes rotation of inner stem 42 which causes rotation of disk 58 to bring a portion of tear drop shaped aperture 64 in alignment with aperture 70 and thus allow fluid flow through valve assembly 28. The tear drop shape of aperture 64 permits an increase in the fluid flow through valve assembly 28 with the continued rotation of outer stem 40.

Cold water supply conduit 14 is integrally formed with mixed water supply conduit 16 as well as being integrally formed with housing 22 of cold water control valve 12 and integrally formed with hot water control valve 18. Mixed water supply conduit 16 is in flow communication with a mixing port 74 which is to be connected to the supply pipe for the tub and/or shower.

Referring now the FIGS. 1–3, hot water control valve 18 comprises a housing 78, a pressure balancer 80, a fluid distribution plate 82, a gasket 84, a stationary ceramic disk 86, a rotating ceramic disk 88, a stem assembly 90, a bonnet 92 and a high temperature adjustment control 94. Housing 78 is integrally formed with conduits 14 and 16 and it defines a chamber 96 which receives cold water from a source of cold water (not shown) through a cold water port 98, receives hot water from a source of hot water (not shown) through a hot water port 100, supplies cold water to supply conduit 14 for feeding cold water control valve 12 and supplies temperature limited hot water to mixed water supply conduit 16 for delivery to mixing port 74.

Pressure balancer 80 is located within chamber 96 of housing 78 between cold water port 98 and supply conduit 14 and between hot water port 100 and mixed water supply conduit 16. Pressure balancer 80 is comprised of a first plastic section 102, a second plastic section 104 and a poppet assembly 106. Pressure balancer 80 is seated against a shoulder 108 formed by housing 78 within chamber 96. A pair of seals 110 and 112 seal the connection between cold water port 98 and section 102 of pressure balancer 80 and between hot water port 100 and section 104 of pressure balancer 80. Poppet assembly 106 is disposed within a chamber formed by sections 102 and 104. Poppet assembly 106 comprises a one-piece poppet unit 116 and a diaphragm 118. Poppet unit 116 is attached to diaphragm 118 by over molding diaphragm 118 to an annular shoulder 120 formed on poppet unit 116.

Diaphragm 118 includes an annular bead 126 which is sandwiched between sections 102 and 104 to provide a fluid tight connection separating the chamber defined by sections 102 and 104 into a cold water chamber 128 and a hot water chamber 130. Cold water chamber 128 includes an input portion 132 which is in communication with cold water port 98, a central portion 134 and an outlet portion 136. Outlet portion 136 is in direct communication with cold water supply conduit 14 to provide the cold water supply to cold water control valve 12. Similarly, hot water chamber 130 includes an input portion 138, a central portion 140 and an outlet portion 142. Poppet unit 116 includes a cold water poppet 144 disposed within central portion 134 and a hot water poppet 146 disposed within central portion 140. Poppets 144 and 146 are integral with the central portion of poppet unit 116 which mounts diaphragm 118. A bore 148 extends radially and axially through poppet 144 to allow cold water to flow from behind poppet 144 and section 102. Likewise, a bore 150 extends radially and axially through poppet 146 to allow hot water to flow from behind poppet 146 and section 104. Poppet 144 controls the fluid flow of cold water by opening and closing a cold water port 152 located within central portion 134 and poppet 146 controls the fluid flow of hot water by opening and closing a hot water port 154 located within central portion 140.

When cold water pressure and hot water pressure are equal, diaphragm 118 is centrally positioned between chambers 128 and 130 allowing an equal amount of cold water and hot water to flow through pressure balancer 80. Cold water is supplied through cold water port 98 into input portion 132, through central portion 134 and port 152 and finally out outlet portion 136. In a similar manner, hot water is supplied through hot water port 100 into input portion 138, through central portion 140 and port 154 and out outlet portion 142. Should the cold water pressure decrease, poppet assembly 106 is urged to the left as shown in FIG. 1 or toward cold water chamber 128. This movement reduces the opening of hot water port 154 and increases the opening of cold water port 152 thereby maintaining the ratio of hot and cold water to stabilize the temperature of the mixed water being supplied through mixing port 74. In a similar manner, should the hot water pressure decrease, poppet assembly 106 is urged to the right as shown in FIG. 1 or toward hot water chamber 130. This movement reduces the opening of cold water port 152 and increases the opening of hot water port 154 thereby maintaining the ratio of the flow of hot and cold water to stabilize the temperature of the mixed water being supplied through mixing port 74. The details and function of pressure balancer 80 are described in more detail in assignees U.S. Pat. No. 5,501,244 the disclosure of which is hereby incorporated herein by reference.

Fluid distribution plate 82 is disposed within chamber 96 with one face positioned adjacent to pressure balancer 80. Fluid distribution plate 82 includes a cold water inlet passage 160 which is in communication with outlet portion 136 of section 102 of balancer 80 and which supplies cold water to high temperature adjustment control 94. Fluid distribution plate 82 includes a hot water passage 162 which is in communication with outlet portion 142 of section 104 of balancer 80 and which supplies hot water to the hot water control portion of hot water control valve 18. A gasket 164 seals the connection between distribution plate 82 and balancer 80, the connection between passage 160 and outlet portion 136 and the connection between passage 162 and outlet portion 142. Fluid distribution plate 82 also includes a cold water outlet passage 166 which receives cold water from high temperature adjustment control 94 and which supplies cold water to the cold water control portion of hot water control valve 18. Gasket 84 is disposed adjacent to the opposite face of distribution plate 82 and operates to seal the interface between plate 82 and stationary ceramic disk 86. Gasket 84 defines a cold water bore 168 in communication with passage 166 of plate 82 and a hot water bore 170 in communication with passage 162.

Referring now to FIG. 3, stationary ceramic disk 86 is positioned on top of gasket 84 as shown in FIG. 1. Ceramic disk 86 includes a radially extending tab 172 which engages high temperature adjustment control 94 to prohibit rotation of disk 86. Ceramic disk 86 defines a cold water passage 174 which is in communication with cold water bore 168 of gasket 84 and a hot water passage 176 which is in communication with hot water bore 170 of gasket 84. Stationary ceramic disk 86 includes a highly polished surface 178 for mating with rotating ceramic disk 88.

Rotating ceramic disk 88 is disposed adjacent to surface 178 of disk 86 and it includes a highly polished surface 180 which mates with surface 178 to form a fluid tight connection between the two surfaces. Rotating ceramic disk 88 defines a cold water tear drop shaped aperture 182 which regulates the amount of cold water that is allowed to flow through control valve 18. Tear drop shaped aperture 182 is radially positioned to align with cold water passage 174 of disk 86 upon rotation of disk 88. Rotating ceramic disk 88 also defines a hot water tear drop shaped aperture 184 which regulates the amount of hot water that is allowed to flow through control valve 18. Tear drop shaped aperture 184 is radially positioned to align with hot water passage 176 of disk 86 upon rotation of disk 88. Stationary disk 86 and rotating disk 88 thus form a hot water valve assembly for hot water control valve 18.

Referring now to FIG. 1, stem assembly 90 comprises an inner stem 186 and an outer stem 188. Inner stem 186 is positioned adjacent to rotating ceramic disk 88 and is rotatably coupled to disk 88. Inner stem 186 defines a chamber 190 which receives cold water from tear drop shaped aperture 182 and hot water from tear drop shaped aperture 184 and directs this mixture of hot and cold water to mixed water supply conduit 16. Inner stem 186 also defines a tab 192 which engages a slot 194 in outer stem 188 to rotationally couple inner stem 186 with outer stem 188. Outer stem 188 extends outward of control valve 18 and is adapted at the end opposite to slot 194 to accept a control knob (not shown).

Bonnet 92 is positioned over stem assembly 90 and defines an open bore 196 having a bushing which accepts stem assembly 90. A seal 198 seals the interface between bonnet 92 and stem assembly 90 to retain water within chamber 190. Bonnet 92 is secured to housing 78 using a plurality of fasteners 200 which allow for the assembly and disassembly of control valve 18 for maintenance and the like. A gasket 202 seals the interface between bonnet 92 and housing 78.

Figure 4:
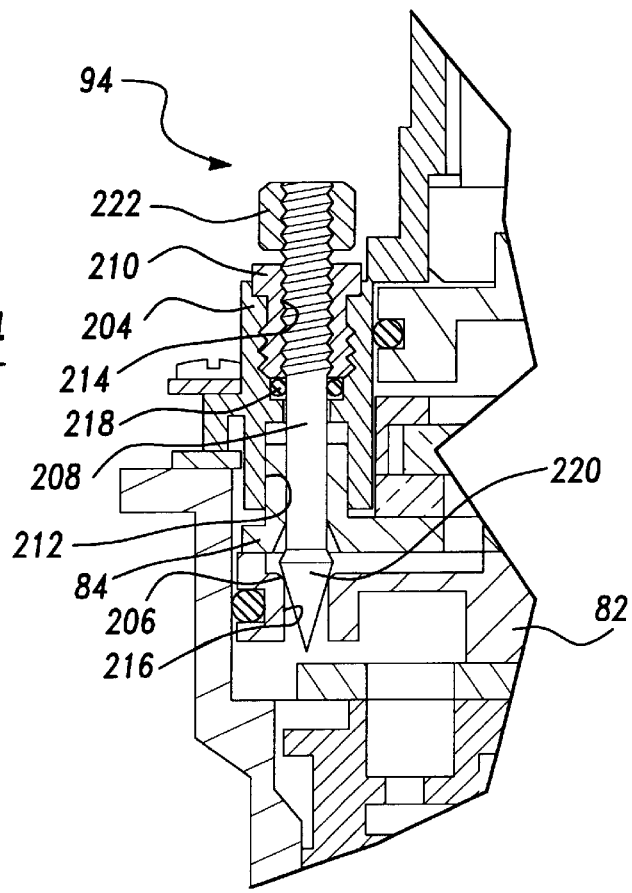
FIG. 4 is an enlarged cross sectional view of the high temperature adjustment system shown in FIG. 1 in a closed position.
Figure 5:
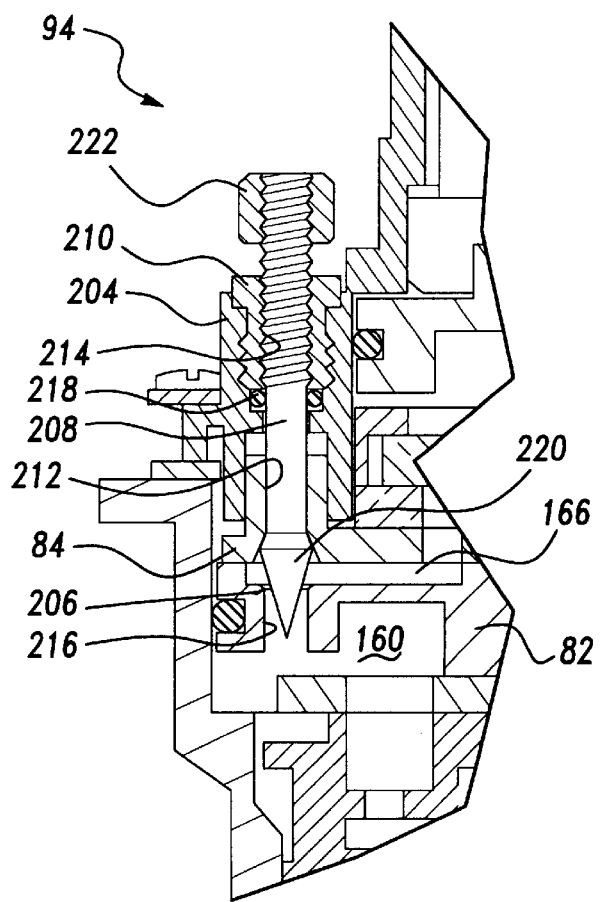
FIG. 5 is a view similar to FIG. 4 but with the high temperature adjustment system being in a full open position.

Referring now to FIGS. 4 and 5, high temperature adjustment control 94 comprises a housing 204, a valve seat 206, a needle valve 208 and a retainer 210. Housing 204 is integrally formed with bonnet 92 and defines a through bore 212 having a threaded end 214. Valve seat 206 is an integral part of fluid distribution plate 82 and is in communication with a cold water flow passage 216 extending through plate 82. Passage 216 is in communication with cold water inlet passage 160 at one end and with cold water outlet passage 166 at the opposite end. Needle valve 208 is threadingly received by retainer 210 which in turn is threadingly received by threaded end 214 of bore 212. A seal 218 is disposed between housing 204 and needle valve 208 to retain water within bore 212. One end of needle valve 208 extends into passage 216 and includes a tapered portion 220 which regulates the amount of cold water allowed to flow through passage 216 depending on the axial position of tapered portion 220 with respect to valve seat 206. The axial position of tapered portion 220 with respect to valve seat 206 is adjusted by rotating needle valve 208 due to the threaded connection between needle valve 208 and retainer 210. Needle valve 208 extends upward through gasket 84, through bore 212 and through threaded end 214 such that the end of needle valve 208 opposite to tapered portion 220 extends outwardly from housing 204. The end of needle valve 208 which extends out from housing 204 is adapted to be assembled to a control knob 222 to facilitate the rotation and thus adjustment of high temperature adjustment control 94.

Referring now to FIGS. 1–5, the assembly of hot water control valve 18 is accomplished by inserting pressure balancer 80 within chamber 96 followed by gasket 164 and fluid distribution plate 82. Needle valve 208 is then assembled with gasket 84 and this assembly is located adjacent to distribution plate 82. Stationary ceramic disk 86 is positioned adjacent gasket 84 followed by rotating ceramic disk 88 and stem assembly 90 which is rotatably coupled to disk 88. Bonnet 92 is then assembled over stem assembly 90 and needle valve 208 and secured in position by fasteners 200. Seal 218 is inserted into bore 212 followed by retainer 210 which threadably engages both housing 204 and needle valve 208. Finally, control device 222 is assembled to needle valve 208. The disassembly of control valve 18 is the reverse of the above described assembly procedure thereby enabling total disassembly of hot water control valve 18 for maintenance and repair after faucet system 10 has been built into the shower or tub wall structure.

Once assembled, hot water control valve 18 operates to balance supply pressures for the hot and cold water for maintaining mixed water temperature, operates to limit the temperature of the hot water supplied to mixed water supply conduit 16 and operates to meter the amount of hot water supplied to mixed water supply conduit 16. The metering function of control valve 18 is based on the rotational position of rotating ceramic disk 88 with respect to stationary ceramic disk 86 in the same manner as cold water control valve 12. When rotating disk 88 is positioned such that hot water passage 176 of stationary disk 86 and cold water passage 174 of stationary disk 86 are aligned with a solid portion of rotating disk 88 and not a portion of apertures 184 and 182, respectively, fluid flow through control valve 18 will be blocked due to the fluid tight engagement of surfaces 178 and 180. The circumferential position of cold water aperture 182 and hot water aperture 184 in relation to passages 174 and 176 is designed such that upon rotation of disk 88, there is simultaneous alignment between cold water aperture 182 and cold water passage 174 and between hot water aperture 184 and hot water passage 176. Rotation of outer stem 188 causes rotation of inner stem 186 which causes rotation of disk 88 to bring a portion of cold water tear drop shaped aperture 182 in alignment with cold water passage 174 simultaneous to bringing a portion of hot water tear drop shaped aperture 184 in alignment with hot water passage 176 and thus allow fluid flow through control valve 18. The tear drop shape of apertures 182 and 184 permit an increase in fluid flow through control valve 18 with the continued rotation of outer stem 188 while generally maintaining the mix ratio of hot and cold water.

The cold water flowing through aperture 182 into chamber 190 and the hot water flowing through aperture 184 into chamber 190 mix in chamber 190 to control the maximum temperature of the mixed hot water being supplied to mixed water supply conduit 16 which then mixes with cold water from cold water control valve 12 to provide the desired water temperature at mixing port 74. The amount of cold water which is supplied to cold water aperture 182 is controlled by high temperature adjustment control 94. The rotation of needle valve 208 adjusts the opening between tapered portion 220 of needle valve 208 and valve seat 206 to regulate the amount of cold water which is supplied to chamber 190 and thus the temperature of the hot water supplied to mixed water supply conduit 16. This hot water temperature control and the pressure balancing system described above both will function with only hot water control valve 18 open. The opening of cold water control valve 12 is not required for the operation of these two controls offering both convenience and safety to the user while the design for control valve 18 provides the accessibility to these controls for maintenance and/or repair.

Referring now to FIGS. 6–9, there is shown a faucet system in accordance with the present invention which is designated generally by the reference numeral 310. Faucet system 310 is similar to faucet system 10 with the exception being that the pressure balancing system is located remotely from the control valves. The function and operation of faucet system 310 is identical to the function and operation of faucet system 10. Features in faucet assembly 310 which are the same as those in faucet assembly 10 are given the same reference number. Features in faucet assembly 310 which are similar to those in faucet assembly 10 have reference numerals which are increased by 300. Faucet system 310 comprises cold water control valve 312, cold water supply conduit 14, mixed water supply conduit 16, a hot water control valve 318 and a pressure balancer 380. Cold water control valve 312 is similar to cold water control valve 12 except that housing 22 is replaced with housing 322. Housing 322 is similar to housing 22 except that housing 322 includes cold water port 98.

Hot water control valve 318 comprises a housing 378, a gasket 384, a stationary ceramic disk 386, a rotating ceramic disk 388, a stem assembly 390, a bonnet 392 and a high temperature adjustment control 394. Housing 378 is integrally formed with conduits 14 and 16 and it defines a chamber 396 which receives cold water from cold water supply conduit 14 which receives water through cold water port 98, receives hot water from a source of hot water (not shown) through hot water port 100 and supplies temperature limited hot water to mixed water supply conduit 16 for delivery to mixing port 74.

Stationary ceramic disk 386 is positioned on top of gasket 384 which is positioned within chamber 396 against a shoulder 356 formed by housing 378. Gasket 384 defines cold water bore 168 in communication with cold water port 98 and hot water bore 170 in communication with hot water port 100. Cold water bore 168 is also in communication with cold water passage 174 of disk 386 and hot water bore 170 is also in communication with hot water passage 176 of disk 386. Stationary ceramic disk 386 includes polished surface 178 for mating with rotating ceramic disk 388.

Rotating ceramic disk 388 is disposed adjacent surface 178 of disk 386 and it includes polished surface 180 which mates with surface 178 to form the fluid tight connection. Rotating disk 388 defines cold water tear drop shaped aperture 182 and hot water tear drop shaped aperture 184 which mate with passages 174 and 176, respectively, as described above.

Stem assembly 390 comprises an inner stem 486 and an outer stem 488. Inner stem 486 is positioned adjacent to rotating ceramic disk 388 and is rotatably coupled to disk 388. Inner stem 186 defines a chamber 352 which receives cold water from aperture 182 and hot water from aperture 184 and directs this mixture of hot and cold water to mixed water supply conduit 16 through a plurality of holes 354. Inner stem 486 defines a tab 492 which engages a slot 494 in outer stem 488 to rotationally couple inner stem 486 with outer stem 488. Outer stem 488 extends outward of control valve 318 and is adapted at the end opposite to slot 494 to accept a control knob (not shown).

Bonnet 392 is positioned over stem assembly 390 and defines a bore 496 having a bushing which accepts stem assembly 390. A seal 498 seals the interface between bonnet 392 and stem assembly 390 to retain water within chamber 352. Bonnet 392 is secured to housing 378 using a threaded connection similar to that described above for bonnet 24 of cold water control valve 12. The threaded connection for bonnet 392 also permits the disassembly of control valve 318 for maintenance and/or repair. A gasket 502 seals the interface between bonnet 392 and housing 378.

Figure 8:
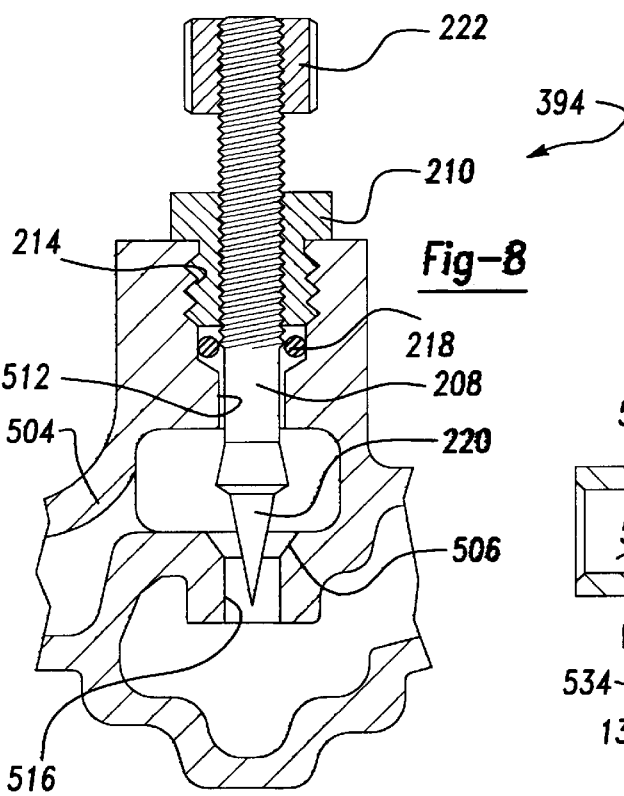
FIG. 8 is a cross sectional side view taken in the direction of arrows 8—8 shown in FIG. 6.
Figure 7:
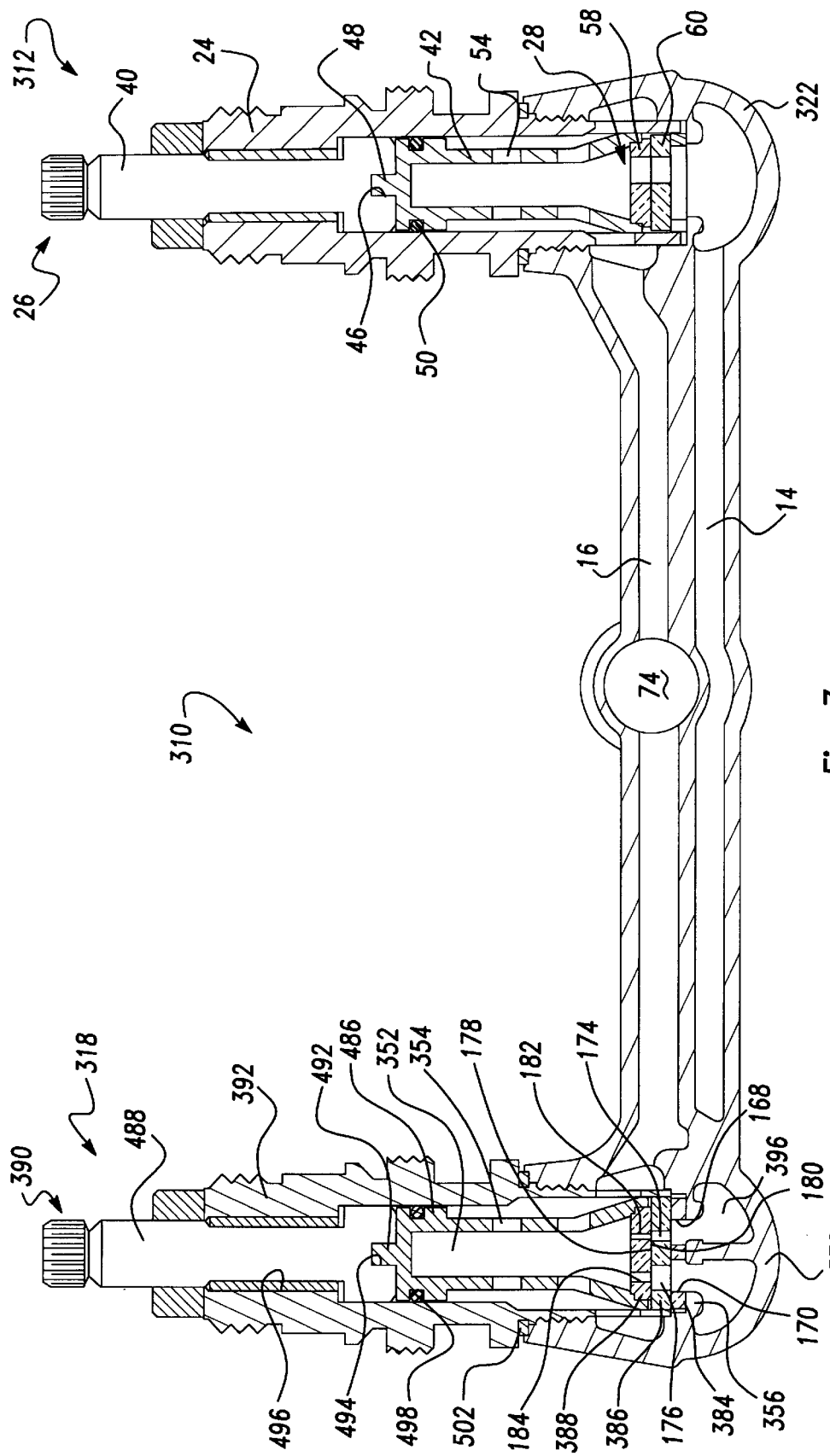
FIG. 7 is a cross sectional side view taken in the direction of arrow 7—7 shown in FIG. 6.

Referring now to FIGS. 7 and 8, high temperature adjustment control 394 comprises a housing 504, a valve seat 506, needle valve 208 and retainer 210. Housing 504 is integrally formed with housing 378 and defines a through bore 512 having threaded end 214. Valve seat 506 is an integral part of housing 378 and is in communication with a cold water flow passage 516 extending through housing 378. Passage 516 is in communication with cold water supply conduit 14 and port 98 at one end and with cold water passage 174 of stationary disk 386 at its opposite end. Needle valve 208 is threadingly received by retainer 210 which in turn is threadingly received by threaded end 214 of bore 512. Seal 218 is disposed between housing 504 and needle valve 208 to retain water within bore 512. Identical to adjustment control 94, the axial position of tapered portion 220 with respect to valve seat 506 is adjusted by rotating needle valve 208 due to the threaded connection between needle valve 208 and retainer 210.

The function and operation of high temperature adjustment control 394 is identical to that of control 94 in that it operates to limit the hot water temperature supplied to mixed water supply conduit 16. Also, identical to faucet system 10, the high temperature limit control feature of faucet system 310 functions with only hot water control valve 318 being turned on due to the direct supply of cold water from cold water port 98 to cold water supply conduit 14 to hot water control valve 318.

Figure 6:
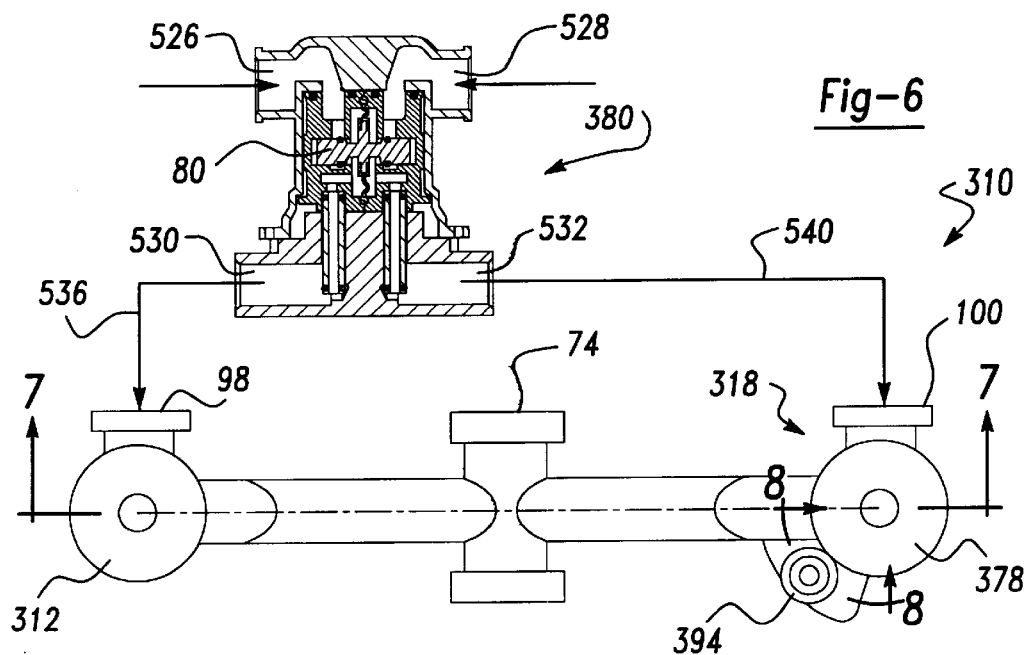
FIG. 6 is a top plan view of a two handle anti-scald faucet system in accordance with another embodiment of the present invention.
Figure 9:
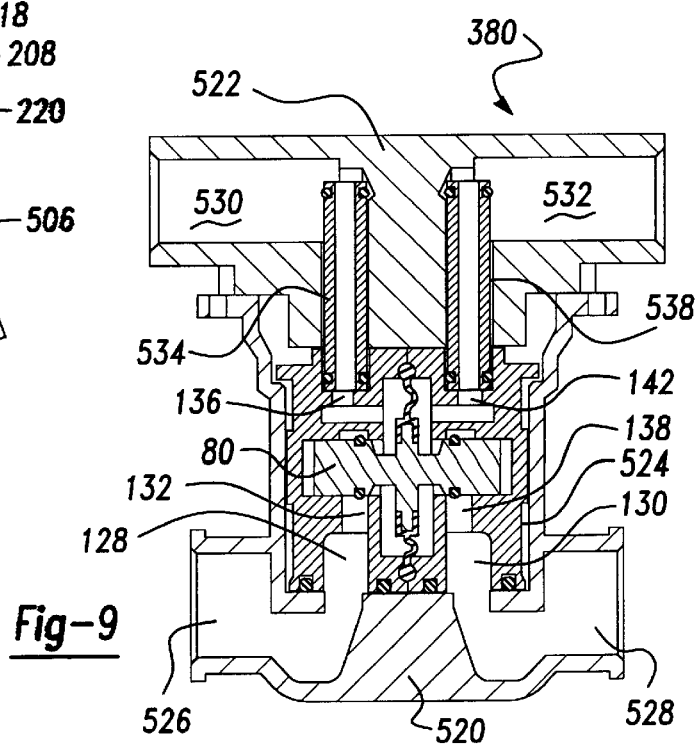
FIG. 9 is a cross sectional view of the remote pressure balancer shown in FIG. 6.

Referring now to FIG. 9, pressure balancer 380 includes pressure balancer 80, an inlet housing 520 and an outlet housing 522. Pressure balancer 80, described above is disposed within a chamber 524 defined by inlet housing 520. Inlet housing 520 defines a cold water inlet 526 which is in communication with a source of cold water supply (not shown) at one end and with input portion 132 of chamber 128 at the opposite end. Inlet housing 520 also defines a hot water inlet 528 which is in communication with a source of hot water supply (not shown) at one end and with input portion 138 of hot water chamber 130 at the opposite end. Outlet housing 522 is attached to inlet housing 520 and includes a cold water outlet 530 and a hot water outlet 532. Cold water outlet 530 is in communication with outlet portion 136 of chamber 128 through a tubular conduit 534 at one end and with cold water port 98 at the opposite end through a water pipe 536 (FIG. 6). Hot water outlet 532 is in communication with outlet portion 142 of chamber 130 through a tubular conduit 538 at one end and with hot water port 100 at the opposite end through a water pipe 540 (FIG. 6).

The function and operation of pressure balancer 380 is identical to that of pressure balancer 80 assembled into hot water control valve 18 as described above.

Figure 10:
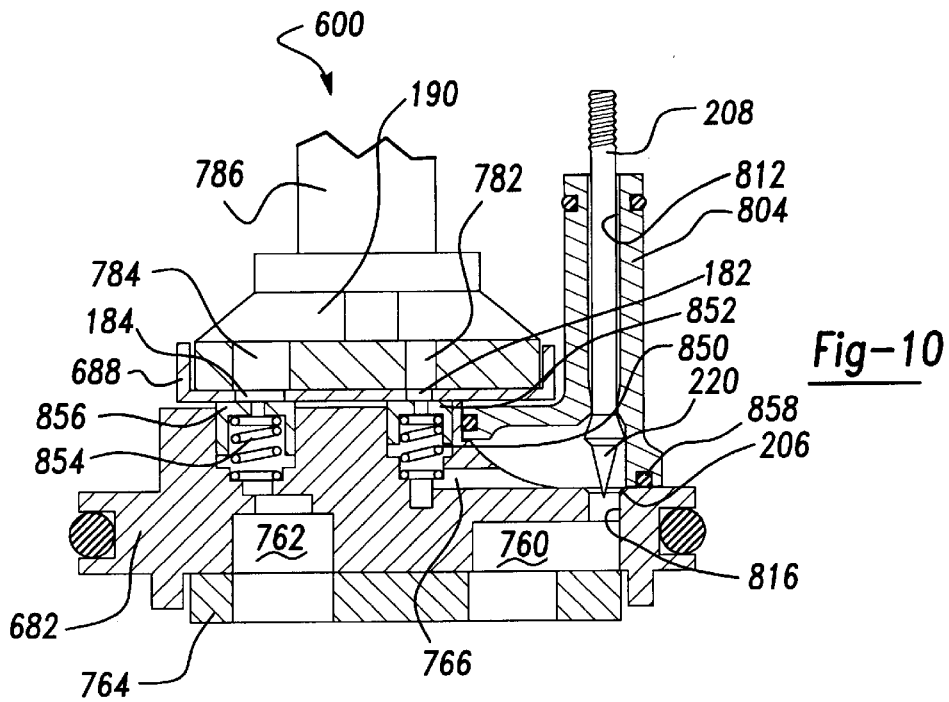
FIG. 10 is a cross sectional view illustrating the hot water control valve of a two handle anti-scald faucet system in accordance with another embodiment of the present invention.
Figure 11:
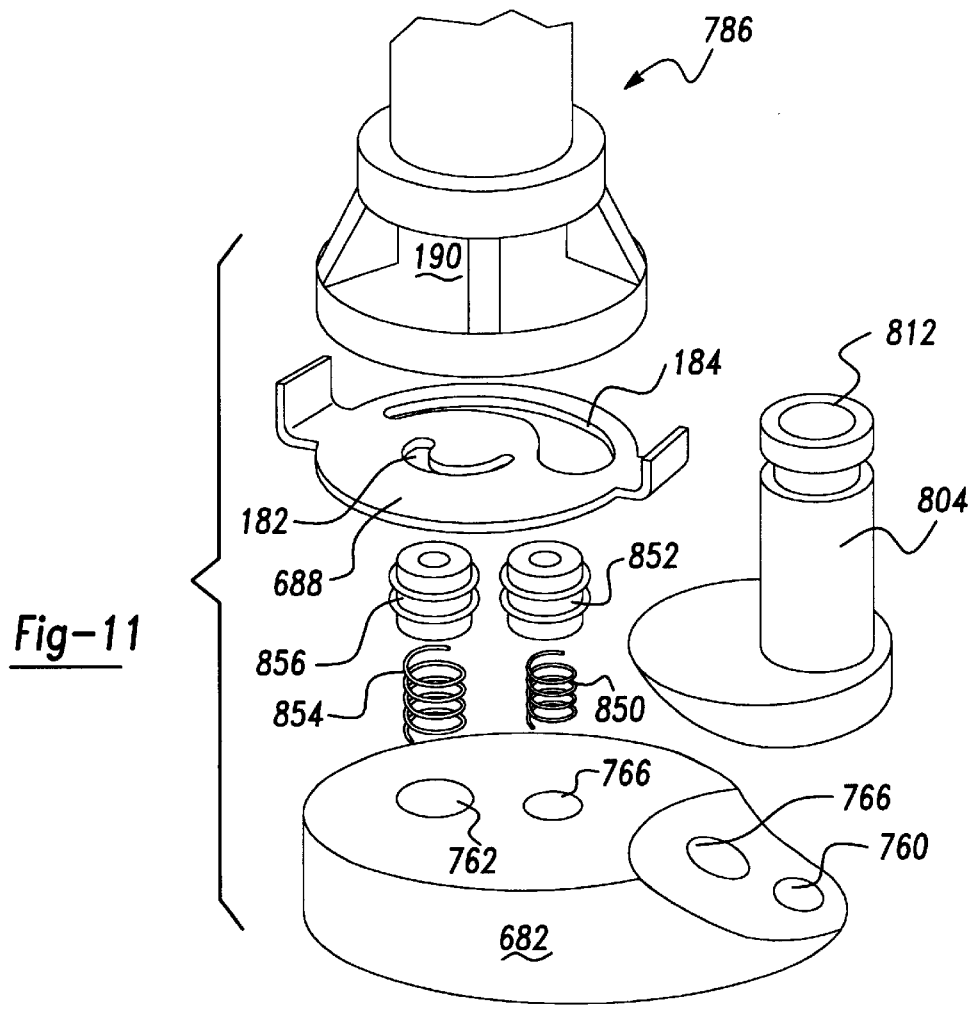
FIG. 11 is an exploded perspective view of the hot water control valve shown in FIG. 10.

Referring now to FIGS. 10 and 11, a valve assembly in accordance with another embodiment of the present invention which is designated generally by the reference numeral 600. Features in valve assembly 600 which are the same as those in control valve 18 are given the same reference number. Features in valve assembly 600 which are similar to those in control valve 18 have reference numerals which are increased by 600. Valve assembly 600 is designed to replace the various components of hot water control valve 18 to change control valve 18 from a ceramic valve to a rubber and stainless steel valve. Valve assembly 600 comprises a fluid distribution plate 682, a rotating disk 688, an inner stem 786 and a housing 804. Fluid distribution 682 plate is designed to be positioned with one face adjacent to pressure balancer 80. Fluid distribution plate 682 includes a cold water inlet passage 760 which is in communication with outlet portion 136 of section 102 of pressure balancer 80 and which supplies cold water to housing 804. Fluid distribution plate 682 includes a hot water passage 762 which is in communication with outlet portion 142 of section 104 of pressure balancer 80 and which supplies hot water for valve assembly 600. A gasket 764 seals the connection between distribution plate 682 and balancer 80, the connection between passage 760 and outlet portion 136 and the connection between passage 762 and outlet portion 142. Fluid distribution plate 682 also includes a cold water outlet passage 766 which receives cold water from housing 804 and which supplies cold water for valve assembly 600. The upper end of passage 766 houses a spring 850 and a rubber seal 852. Spring 850 biases rubber seal 852 away from plate 682 and against rotating disk 688. The upper end of passage 762 houses a spring 854 and a rubber seal 856. Spring 854 biases rubber seal 856 away from plate 682 and against rotating disk 688. Rubber seals 852 and 856 and plate 682 eliminate the need for having a stationary disk similar to disk 86.

Rotating disk 688 is disposed adjacent to plate 682 and seals 852 and 856. Disk 688 defines cold water tear drop shaped aperture 182 which regulates the amount of cold water that is allowed to flow through valve assembly 600. Tear drop shaped aperture 184 is radially positioned to align with cold water outlet passage 766 upon rotation of disk 688. Rotating disk 688 also defines hot water tear drop shaped aperture 184 which regulates the amount of hot water that is allowed to flow through valve assembly 600. Tear drop shaped aperture 184 is radially positioned to align with hot water passage 762 upon rotation of disk 688. Rotating disk 688 is secured to inner stem 786 for rotation therewith. Inner stem 786 defines a cold water tear drop shaped aperture 782 which aligns with tear drop shaped aperture 182. Inner stem 786 defines a hot water aperture 784 which aligns with tear drop shaped aperture 184. Inner stem 786 also defines chamber 190 for providing mixed hot water from apertures 182, 782, 184 and 784. The upper portion of inner stem 786 is similar to inner stem 186.

Housing 804 defines a through bore 812 which accepts needle valve 208. Housing 804 also defines a cold water flow passage 816. Passage 816 is in communication with cold water inlet passage 760 at one end and with cold water outlet passage 766 at the opposite end. Fluid distribution plate 682 defines valve seat 206 and the function and operation of needle valve 208 which is threadingly received in a bonnet (not shown), valve seat 206 and housing 804 are identical to that described above for high temperature adjustment control 94. Housing 804 is disposed adjacent to fluid distribution plate 682 with a seal 858 sealing the interface between the two components. A valve similar to valve assembly 600 is described in better detail in the aforementioned U.S. Pat. No. 5,501,244.

While the above detailed description describes the preferred embodiment of the present invention, it should be understood that the present invention is susceptible to modification, variation and alteration without deviating from the scope and fair meaning of the subjoined claims.

What is claimed is:

1. A faucet system comprising:
    a housing defining a cold water chamber, a hot water chamber, a cold water supply conduit extending between said cold water chamber and said hot water chamber and a mixed water conduit extending between said cold water chamber and said hot water chamber;
    a cold water port defined by said housing for supplying cold water to said hot water chamber;
    a hot water port defined by said housing for supplying hot water to said hot water chamber;
    a cold water valve assembly for regulating cold water flow through said mixed water conduit, said cold water valve assembly being disposed within said cold water chamber between said cold water supply conduit and said mixed water conduit, said cold water valve assembly being in communication with said cold water port through said cold water supply conduit;
    a hot water valve assembly for regulating hot water flow through said mixed water conduit, said hot water valve assembly being disposed within said hot water chamber between said hot water port and said mixed water conduit and between said cold water port and said mixed water conduit;
    a pressure balancer in communication with said hot and cold water ports, said pressure balancer being disposed between said hot water port and said hot water valve assembly and between said cold water port and said hot water valve assembly, said pressure balancer maintaining a specified temperature of said hot water; said pressure balancer comprising:
        a poppet unit composed of a rigid material and mounted of movement within said chamber;
        a diaphragm mounted on said poppet unit and separating said chamber into a first compartment defining a first fluid flow path and a second compartment defining a second fluid flow path, a portion of said poppet unit being located in said first compartment;
        a closure surface located in the first compartment adjacent said first flow path; and
        a compliant element mounted on and confined compliantly to the portion of the poppet unit for incremental movement therewith, the compliant element being aligned with and normally spaced from the closure surface and moved with the poppet unit to compliantly engage the closure surface and thereby seal the first fluid flow path upon movement of the diaphragm in a prescribed direction; and
    an adjustable high temperature control disposed between said pressure balancer and said hot water valve assembly, said specified temperature being set by said adjustable high temperature control.

2. The faucet system according to claim 1 wherein, said pressure balancer defines a cold water passage extending between said cold water port and said adjustable high temperature control.

3. The faucet system according to claim 1 wherein, said adjustable high temperature control comprises:
    a valve seat disposed within said hot water chamber; and
    a needle valve extending through said housing into said hot water chamber, said needle valve being adjustable with respect to said valve seat.

4. The faucet system according to claim 3 wherein, said needle valve is threadingly received within said housing.

5. The faucet system according to claim 3 wherein, said faucet system further includes a fluid distribution plate disposed between said pressure balancer and said valve assembly, said valve seat being defined by said fluid distribution plate.

* * * * *